United States Patent
Chen et al.

(10) Patent No.: US 8,242,637 B2
(45) Date of Patent: Aug. 14, 2012

(54) POWER SOURCE SWITCHING CIRCUIT

(75) Inventors: Shi-Tao Chen, Shenzhen (CN);
Sheng-Chung Huang, Taipei Hsien (TW); Hsiang-Jui Hung, Taipei Hsien (TW); Da-Wei Jin, Shenzhen (CN); Lei Yang, Shenzhen (CN); Yong-Xian Zhao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 535 days.

(21) Appl. No.: 12/477,768

(22) Filed: Jun. 3, 2009

(65) Prior Publication Data

US 2010/0231048 A1 Sep. 16, 2010

(30) Foreign Application Priority Data

Mar. 16, 2009 (CN) .......................... 2009 1 0300883

(51) Int. Cl.
*H02J 1/00* (2006.01)
(52) U.S. Cl. ....................................................... 307/85
(58) Field of Classification Search .................. 326/123, 326/112, 113, 114; 327/408, 63; 307/66, 307/130, 85, 69, 113, 139, 112
See application file for complete search history.

(56) References Cited

U.S. PATENT DOCUMENTS

| | | | | |
|---|---|---|---|---|
| 4,492,876 A | * | 1/1985 | Colbert et al. | 307/66 |
| 5,668,463 A | * | 9/1997 | Duley | 320/103 |
| 5,945,816 A | * | 8/1999 | Marusik | 323/273 |
| 6,420,906 B1 | * | 7/2002 | Kohda | 326/114 |

* cited by examiner

*Primary Examiner* — Daniel Cavallari
(74) *Attorney, Agent, or Firm* — Altis Law Group, Inc.

(57) ABSTRACT

A power source switching circuit includes a main source input terminal, an auxiliary source input terminal, a control circuit, a first switch, a second switch, and an output terminal. The control circuit is connected to the main source input terminal and the auxiliary source input terminal. The first switch is connected to the main source input terminal and the control circuit. The second switch is connected to the auxiliary source input terminal and the control circuit. The output terminal is connected to the first switch and the second switch. When the main source input terminal is at high level, the auxiliary source input terminal remains high level, the first switch is turned on, and the second switch is turned off by the control circuit.

11 Claims, 4 Drawing Sheets

POWER SOURCE SWITCHING CIRCUIT

BACKGROUND

1. Technical Field

The present disclosure relates to a power source switching circuit automatically switching between a main source and an auxiliary source.

2. Description of Related Art

A power supply supplies power to electronic devices such as computers. The power supply includes a main source supplying power during normal operation and an auxiliary source supplying power during standby operation. Both sources may be applied in the electronic device simultaneously to supply power in all operating modes.

What is needed, therefore, is a power source switching circuit automatically switching between a main source and an auxiliary source of a power supply.

DETAILED DESCRIPTION

Figure 1:
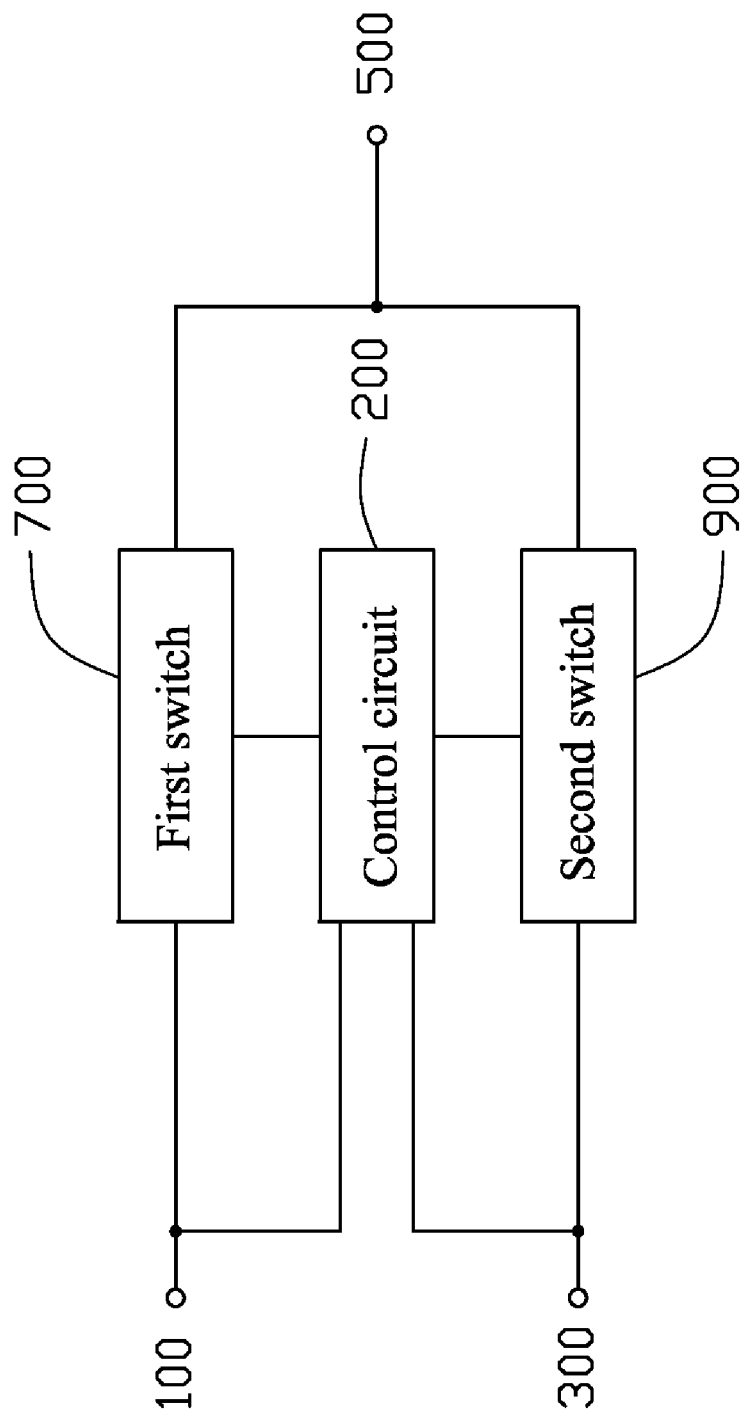
FIG. 1 is a schematic diagram of an embodiment of a power source switching circuit.

Referring to FIG. 1, a power source switching circuit automatically switches between a main source and an auxiliary source of a power supply. The power supply includes a main source terminal supplying the main source during normal operations, and an auxiliary source terminal supplying the auxiliary source during standby operations. The power source switching circuit includes a main source input terminal 100 connected to the main source terminal of the power supply, an auxiliary source input terminal 300 connected to the auxiliary source terminal of the power supply, a first switch 700, a second switch 900, a control circuit 200, and an output terminal 500 connected to the electronic device.

Figure 2:
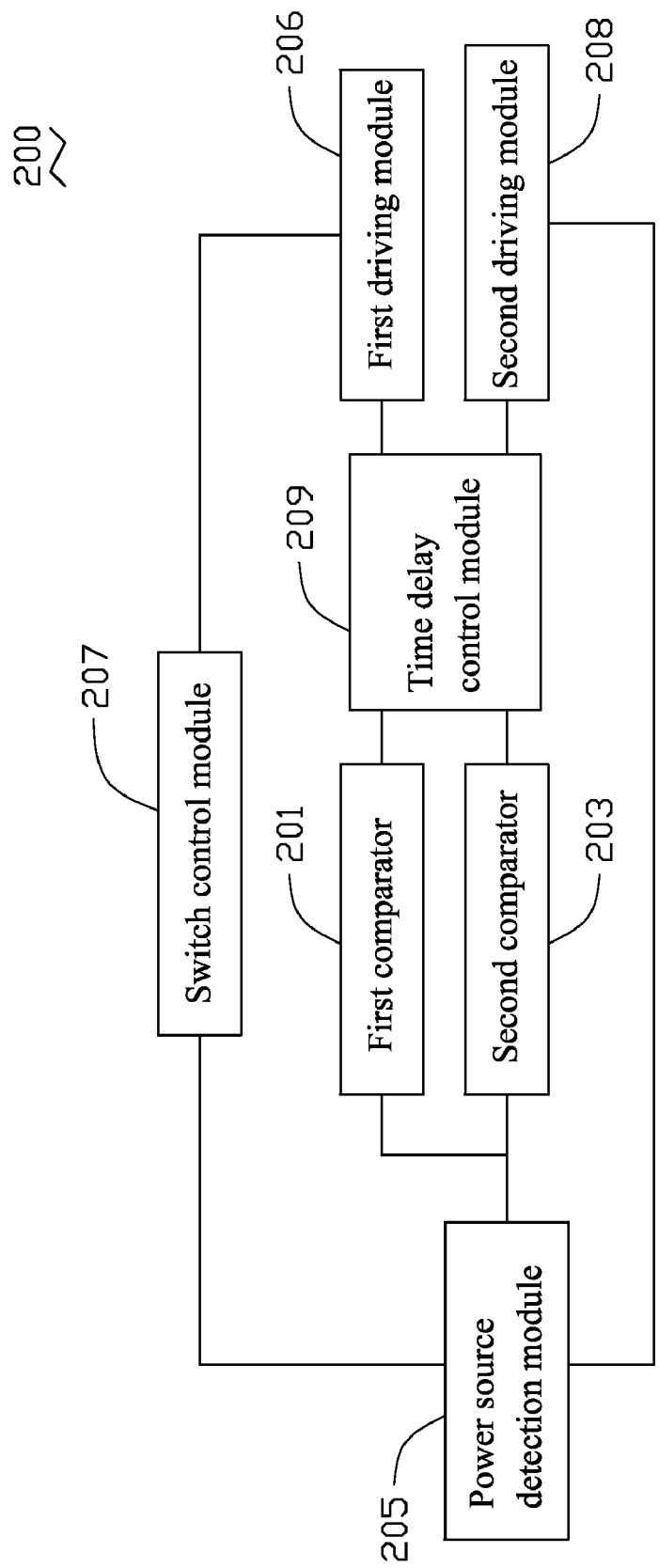
FIG. 2 is a schematic diagram of a control circuit of FIG. 1.

Referring to FIG. 2, the control circuit 200 can include a power source detection module 205, a switch control module 207 connected to the power source detection module 205, a first comparator 201, a second comparator 203, a time delay control module 209 connected between the first comparator 201 and the second comparator 203, a first driving module 206, and a second driving module 208. The power source detection module 205 is configured for detecting the voltage of the main source input terminal 100. The switch control module 207 is configured for controlling the stability of the first switch 700 and the second switch 900. The time delay control module 209 is configured for controlling the time delay between the first comparator 201 and the second comparator 203. The first driving module 206 is configured for opening or closing the first switch 700, and the second driving module 208 is configured for opening or closing the second switch 900.

Figure 3:
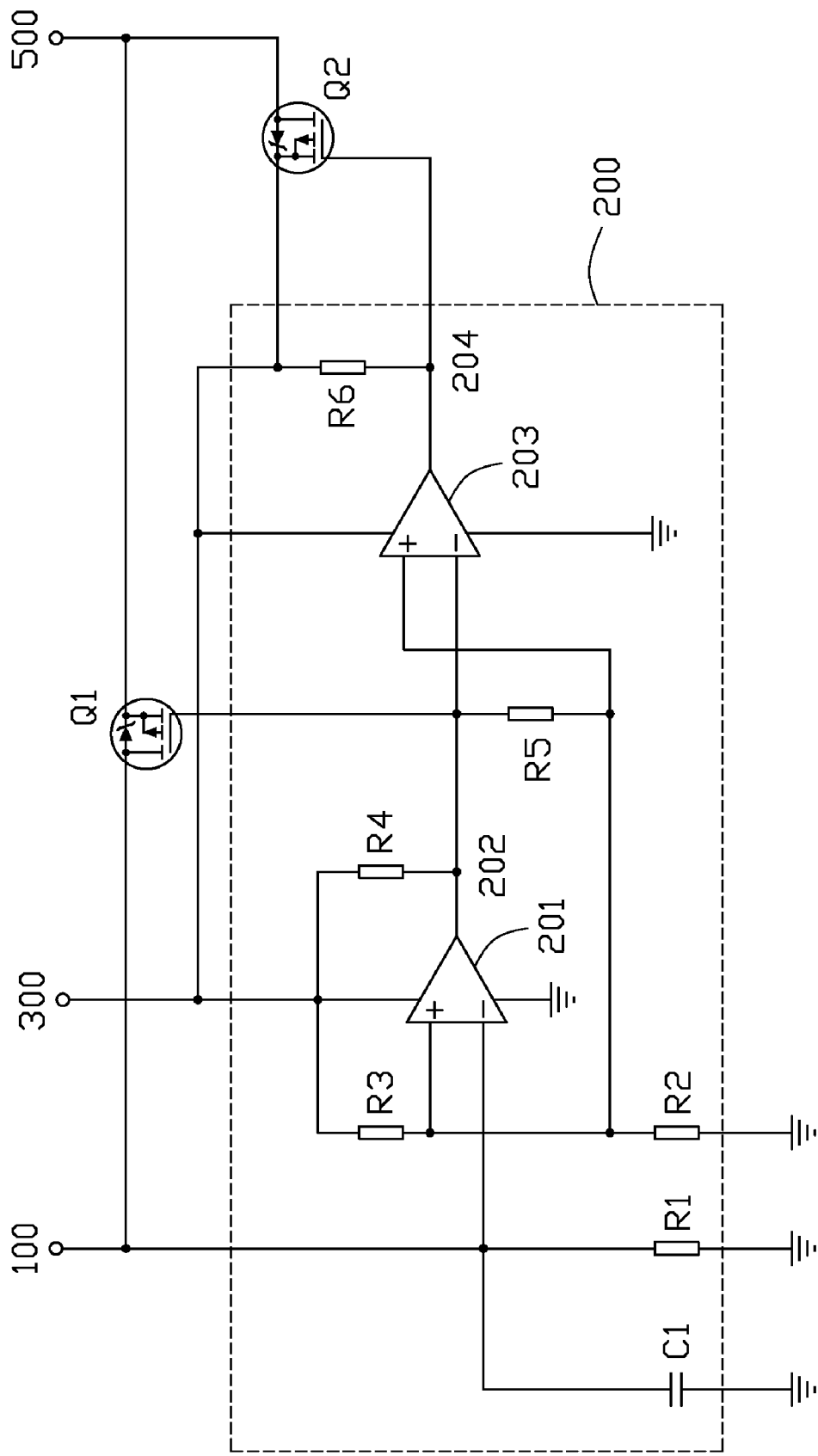
FIG. 3 is a circuit diagram of the power source switching circuit of FIG. 1.

Referring to FIG. 3, in the embodiment, the first switch 700 is a first transistor Q1, the second switch 900 is a second transistor Q2, and the two transistors Q1, Q2 are the P-channel MOSFETs (metal oxide semiconductor field effect transistors). The control circuit 200 includes a capacitor C1, resistors R1, R2, R3, R4, R5, R6, the first comparator 201, and the second comparator 203. The power source detection module 205 can be integrated in the first comparator 201. The resistor R5 can be as the switch control module 207 for controlling the stability of the two transistors Q1, Q2. The time delay control module 209 can be integrated in the first comparator 201 and the second comparator 203. The first driving module 206 and the second driving module 208 are correspondingly integrated in the first comparator 201 and the second comparator 203. A power terminal of the first comparator 201 is connected to the auxiliary source input terminal 300. A positive input terminal of the first comparator 201 is connected to the auxiliary source input terminal 300 through the resistor R3, and is also connected to ground through the resistor R2. A negative input terminal of the first comparator 201 is connected to the main source input terminal 100, and is also connected to ground through the capacitor C1 and the resistor R1. A ground terminal of the first comparator 201 is connected to ground. An output terminal of the first comparator 201 is connected to the auxiliary source input terminal 300 through a node 202 and the resistor R4. A power terminal of the second comparator 203 is connected to the auxiliary source input terminal 300. A positive input terminal of the second comparator 203 is connected to ground through the resistor R2. A negative input terminal of the second comparator 203 is connected to the output terminal of the first comparator 201. A ground terminal of the second comparator 203 is connected to ground. An output terminal of the second comparator 203 is connected to the auxiliary source input terminal 300 through a node 204 and the resistor R6.

A gate of the first transistor Q1 is connected to the negative input terminal of the second comparator 203, and is also connected to the positive input terminal of the second comparator 203 through the resistor R5. A drain of the first transistor Q1 is connected to the main source input terminal 100, and a source of the first transistor Q1 is connected to the output terminal 500. A gate of the second transistor Q2 is connected to the output terminal of the second comparator 203. A drain of the second transistor Q2 is connected to the output terminal 500. A source of the second transistor Q2 is connecter to the auxiliary source input terminal 300.

Figure 4:
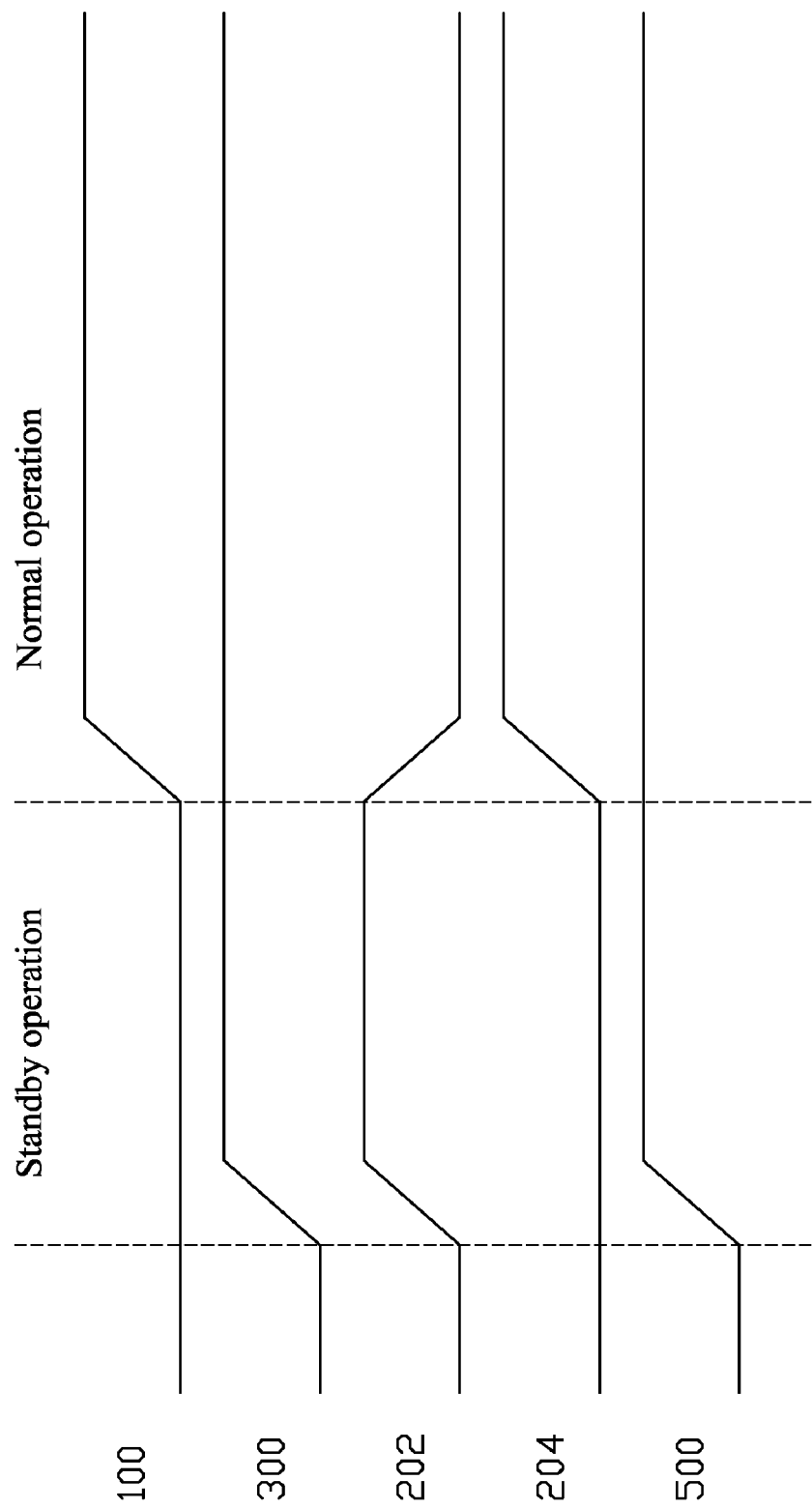
FIG. 4 is a sequence diagram of the power source switching circuit of FIG. 3.

Referring to FIG. 4, when the electronic device is in standby operation, the power supply is turned off, the main source input terminal 100 inputs a low level signal to the negative input terminal of the first comparator 201, and the auxiliary source input terminal 300 inputs a high level signal to the positive input terminal of the first comparator 201. The voltage of the positive input terminal is greater than that of the negative input terminal of the first comparator 201, thereby outputting a high level signal to the negative input terminal of the second comparator 203 and the gate of the first transistor Q1. The node 202 is at high level, the first transistor Q1 is turned off, and the source thereof outputs a low level signal to the output terminal 500. Because of the voltage dividing effect of the resistors R2 and R3, the voltage of the positive input terminal is less than that of the negative input terminal of the second comparator 203, therefore outputting a low level signal to the gate of the second transistor Q2. The node 204 is at low level, the second transistor Q2 is turned on, and the drain thereof outputs a high level signal to the output terminal 500. Therefore, the voltage of the output terminal 500 is supplied by the auxiliary source input terminal 300 during the standby operation.

When the electronic device is in normal operation, the power supply is turned on, the main source input terminal 100 inputs a high level signal to the negative input terminal of the first comparator 201, and the auxiliary source input terminal 300 inputs a high level signal to the positive input terminal of the first comparator 201. Because of the voltage dividing effect of the resistors R2 and R3, the voltage of the positive input terminal is less than that of the negative input terminal of the first comparator 201, thereby outputting a low level signal to the negative input terminal of the second comparator 203 and the gate of the first transistor Q1. The node 202 is at low level, the first transistor Q1 is turned on, and the source thereof outputs a high level signal to the output terminal 500. The voltage of the positive input terminal is greater than that of the negative input terminal of the second comparator 203, thereby outputting a high level signal to the gate of the second transistor Q2, the node 204 is at high level, and the second transistor Q2 is turned off. Therefore, the voltage of the output terminal 500 is supplied by the main source input terminal 100 during normal operation.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power source switching circuit, comprising:
a main source input terminal configured to be connected to a main source terminal of a power supply;
an auxiliary source input terminal configured to be connected to an auxiliary source terminal of the power supply;
a control circuit, the control circuit comprising a first comparator and a second comparator; the first comparator comprising a first positive input terminal, a first negative input terminal, and a first output terminal; the second comparator comprising a second positive input terminal, a second negative input terminal, and a second output terminal; the first positive input terminal connected to the auxiliary source input terminal; the first negative input terminal connected to the main source input terminal; the first output terminal connected to the second negative input terminal; the second positive terminal directly connected to the first positive terminal;
a first switch, the first switch comprising a first switch control terminal, a first switch second terminal, and a first switch third terminal; the first switch control terminal connected to the first output terminal; and the first switch second terminal connected to the main source input terminal;
a second switch, the second switch comprising a second switch control terminal, a second switch second terminal, and a second switch third terminal; the second switch control terminal connected to the second output terminal; and the second switch second terminal connected to the auxiliary source input terminal; and
an output terminal connected to the first switch third terminal and the second switch third terminal.

2. The power source switching circuit of claim 1, wherein the first positive input terminal of the first comparator is coupled to the auxiliary source input terminal through a first resistor and is coupled to ground through a second resistor.

3. The power source switching circuit of claim 1, wherein the first switch is a first transistor; the first switch control terminal is a first gate of the first transistor; the first switch second terminal is a first drain of the first transistor; and the first switch third terminal is a first source of the first transistor.

4. The power source switching circuit of claim 3, wherein the first switch is a P-channel MOSFET.

5. The power source switching circuit of claim 1, wherein the second positive input terminal of the second comparator is connected to the first output terminal of the first comparator through a resistor.

6. The power source switching circuit of claim 1, wherein the second switch is a second transistor; the second switch control terminal is a second gate of the second transistor; the second switch second terminal is a second drain of the second transistor; and the second switch third terminal is a second source of the second transistor.

7. The power source switching circuit of claim 6, wherein the second switch is a P-channel MOSFET.

8. The power source switching circuit of claim 1, wherein the first comparator further comprises a first power terminal connected to the auxiliary source input terminal and a first ground terminal connected to ground; and the first output terminal is connected to the first power terminal through a resistor.

9. The power source switching circuit of claim 1, wherein the first negative input terminal is connected to ground through a resistor.

10. The power source switching circuit of claim 1, wherein the first negative input terminal is connected to ground through a capacitor.

11. The power source switching circuit of claim 1, wherein the second comparator further comprises a second power terminal connected to the auxiliary source input terminal and a second ground terminal connected to ground; and the second output terminal is connected to the second power terminal through a resistor.

* * * * *